United States Patent
JI et al.

(10) Patent No.: US 9,970,514 B2
(45) Date of Patent: May 15, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Seongwook JI, Gunpo-si (KR); Seong Wook Hwang, Gunpo-si (KR); Hyun Sik Kwon, Seoul (KR); Ki Tae Kim, Incheon (KR); Wonmin Cho, Hwaseong-si (KR); Jae Chang Kook, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/370,765

(22) Filed: Dec. 6, 2016

(65) Prior Publication Data
US 2018/0073608 A1    Mar. 15, 2018

(30) Foreign Application Priority Data
Sep. 12, 2016    (KR) .................. 10-2016-0117351

(51) Int. Cl.
*F16H 3/66*    (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS 7,651,431 B2    1/2010    Phillips et al.
2017/0261070 A1*    9/2017    Kim .................... F16H 3/66

FOREIGN PATENT DOCUMENTS

KR    10-2016-0070862 A    6/2016

* cited by examiner

*Primary Examiner* — Jacob S. Scott
(74) *Attorney, Agent, or Firm* — Brinks Gilson & Lione

(57) ABSTRACT

The present disclosure provides a planetary gear train of an automatic transmission for a vehicle including an input shaft, an output shaft, four planetary gear sets respectively having three rotational elements, and six control elements for selectively interconnecting the rotational elements and a transmission housing.

10 Claims, 2 Drawing Sheets

FIG. 2

| Speed stages | Control element ||||| Gear ratio |
| --- | --- | --- | --- | --- | --- | --- |
|  | C1 | C2 | C3 | C4 | B1 | B2 |  |
| D1 |  | ● |  |  |  | ● | 5.270 |
| D2 | ● | ● |  |  |  | ● | 3.400 |
| D3 |  | ● |  |  | ● | ● | 2.267 |
| D4 |  | ● |  | ● |  | ● | 1.700 |
| D5 |  | ● |  | ● | ● |  | 1.259 |
| D6 | ● | ● |  | ● |  |  | 1.000 |
| D7 | ● |  |  | ● | ● |  | 0.791 |
| D8 |  |  | ● | ● | ● |  | 0.718 |
| D9 |  | ● | ● |  | ● |  | 0.644 |
| D10 |  |  | ● |  |  |  | 0.467 |
| REV |  |  | ● | ● |  | ● | -7.820 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0117351 filed on Sep. 12, 2016, which is incorporated herein by reference in its entirety.

FIELD

The present disclosure relates to a planetary gear train of an automatic transmission for a vehicle.

BACKGROUND

The statements in this section merely provide background information related to the present disclosure and may not constitute prior art.

Generally, an automatic transmission with more speed stages has been developed to enhance fuel economy and drivability of a vehicle. The increase of oil price makes it difficult to enhance fuel consumption of a vehicle.

In this sense, many researches for reducing weight and enhancing fuel economy through downsizing of an engine and for securing drivability and fuel economy through multiple speed stages of automatic transmissions have been developed.

For more shift-stages of an automatic transmission, the number of internal parts is typically increased, which may affect installability, production cost, weight and/or power flow efficiency. In that aspect, less number of parts is desired to enhance fuel efficiency of an automatic transmission having more shift-stages. An eight-speed automatic transmission has been introduced recently and a planetary gear train for an automatic transmission capable of more shift-stages is under development.

However, a conventional eight-speed automatic transmission typically includes three to four planetary gear sets and five to seven control elements (frictional elements), and this may largely affect the weight of the vehicle.

In this regard, disposing planetary gear sets in parallel or employing dog clutches instead of wet-type control elements has been attempted.

However, such an arrangement may not be widely applicable, and using dog clutches may easily deteriorate shift-feel.

SUMMARY

The present disclosure provides a planetary gear train of an automatic transmission for a vehicle having shift stages of ten forward speeds and one reverse speed, thereby improving power delivery performance and fuel economy.

A planetary gear train of an automatic transmission for a vehicle according to one form of the present disclosure may include an input shaft configured to receive torque of an engine, an output shaft configured to output a shifted torque, a first planetary gear set having a first, a second, and a third rotational elements, a second planetary gear set having a fourth, a fifth, and a sixth rotational elements, a third planetary gear set having a seventh, an eighth, and a ninth rotational elements, a fourth planetary gear set having a tenth, an eleventh, and a twelfth rotational elements, a first shaft connected to the first rotational element, a second shaft connected to the second rotational element and the fourth rotational element and connected to the input shaft, a third shaft connected to the third rotational element, the sixth rotational element and the tenth rotational element, a fourth shaft connected to the fifth rotational element, a fifth shaft connected to the seventh rotational element and selectively connected to the first shaft and the second shaft, a sixth shaft connected to the eighth rotational element and selectively connected to the fourth shaft, a seventh shaft connected to the ninth rotational element and the eleventh rotational element and connected to the output shaft, and an eighth shaft connected to the twelfth rotational element and selectively connected to the sixth shaft.

Each of the first shaft and the eighth shaft may be selectively connected to a transmission housing.

The first, the second, and the third rotational elements of the first planetary gear set may be respectively a first sun gear, a first planet carrier, and a first ring gear. The fourth, the fifth, and the sixth rotational elements of the second planetary gear set may be respectively a second sun gear, a second planet carrier, and a second ring gear. The seventh, the eighth, and the ninth rotational elements of the third planetary gear set may be respectively a third sun gear, a third planet carrier, and a third ring gear. The tenth, the eleventh, and the twelfth rotational elements of the fourth planetary gear set may be respectively a fourth sun gear, a fourth planet carrier, and a fourth ring gear.

The first, the second, the third, and the fourth planetary gear sets may be arranged in an order of the first, the second, the third, and the fourth from an engine side.

The planetary gear train may further include a first clutch selectively connecting the second shaft and the fifth shaft; a second clutch selectively connecting the first shaft and the fifth shaft; a third clutch selectively connecting the fourth shaft and the sixth shaft; a fourth clutch selectively connecting the sixth shaft and the eighth shaft; a first brake selectively connecting the first shaft and the transmission housing; and a second brake selectively connecting the eighth shaft and the transmission housing.

A planetary gear train of an automatic transmission for a vehicle according to one form of the present disclosure may include an input shaft configured to receive an engine torque, an output shaft configured to output a shifted torque, a first planetary gear set having a first, a second, and a third rotational elements, a second planetary gear set having a fourth, a fifth, and a sixth rotational elements, a third planetary gear set having a seventh, an eighth, and a ninth rotational elements, and a fourth planetary gear set having a tenth, an eleventh, and a twelfth rotational elements, wherein the input shaft may be connected to the second rotational element, the output shaft may be connected to the eleventh rotational element, the second rotational element may be connected to the fourth rotational element, the third rotational element may be connected to the sixth rotational element and the tenth rotational element, the ninth rotational element may be connected to the eleventh rotational element, the seventh rotational element may be selectively connected to the first, second rotational elements, the eighth rotational element may be selectively connected to the fifth rotational element, and the twelfth rotational element may be selectively connected to the eighth rotational element.

Each of the first rotational element and the twelfth rotational element may be selectively connected to a transmission housing.

The first, the second, and the third rotational elements of the first planetary gear set may be respectively a first sun gear, a first planet carrier, and a first ring gear. The fourth, the fifth, and the sixth rotational elements of the second planetary gear set may be respectively a second sun gear, a second planet carrier, and a second ring gear. The seventh, the eighth, and the ninth rotational elements of the third planetary gear set may be respectively a third sun gear, a third planet carrier, and a third ring gear. The tenth, the eleventh, and the twelfth rotational elements of the fourth planetary gear set may be respectively a fourth sun gear, a fourth planet carrier, and a fourth ring gear.

The first, the second, the third, and the fourth planetary gear sets may be arranged in an order of the first, the second, the third, and the fourth from an engine side.

The planetary gear train may further include a first clutch selectively connecting the fourth rotational element and the seventh rotational element; a second clutch selectively connecting the first rotational element and the seventh rotational element; a third clutch selectively connecting the fifth rotational element and the eighth rotational element; a fourth clutch selectively connecting the eighth rotational element and the twelfth rotational element; a first brake selectively connecting the first rotational element and the transmission housing; and a second brake selectively connecting the twelfth rotational element and the transmission housing.

The planetary gear train according to one form of the present disclosure may achieve ten forward speed stages and one reverse speed stage by operating the four planetary gear sets and controlling six control elements.

In addition, the planetary gear train according to one form of the present disclosure may improve driving stability when speed stages become suitable for a rotational speed of the engine. Particularly, silent driving of the vehicle may be improved by using operation point positioned at a low rotational speed region of an engine.

Moreover, the planetary gear train according to one form of the present disclosure may increase driving efficiency of the engine and may improve power delivery performance and fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of respective control elements at each respective shift stages in a planetary gear train.

Figure 1:
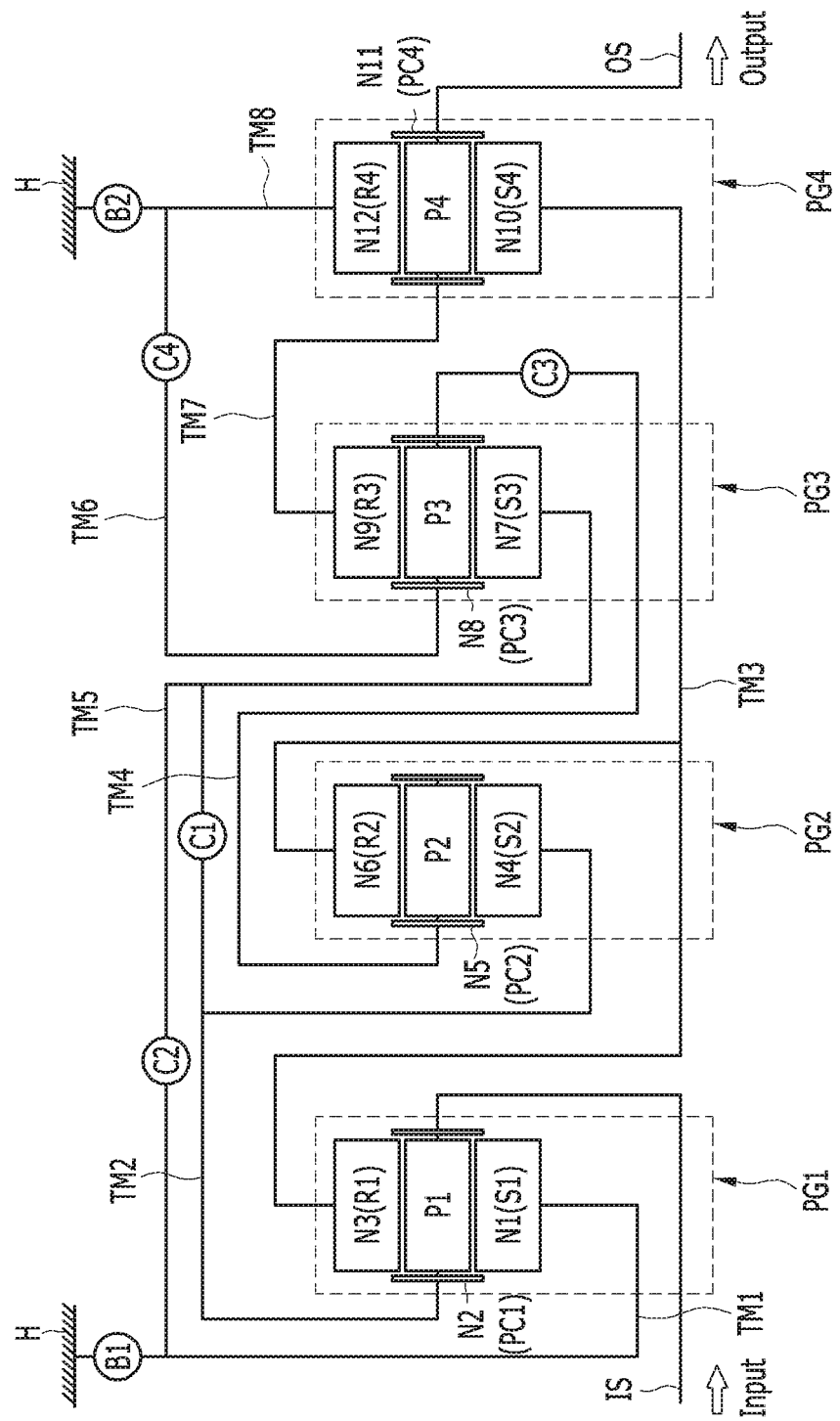
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to avoid any confusion as the names of the components are identical to one another; thus, an order thereof is not particularly limited.

FIG. 1 is a schematic diagram of a planetary gear train according to one form of the present disclosure.

Referring to FIG. 1, a planetary gear train according to one form of the present disclosure includes a first, a second, a third, and a fourth planetary gear sets PG1, PG2, PG3, and PG4 arranged on the same axis, an input shaft IS, an output shaft OS, eight rotational shafts TM1 to TM8 connected to at least one of rotational elements of the first, the second, the third, and the fourth planetary gear sets PG1, PG2, PG3, and PG4, four clutches C1 to C4 and two brakes B1 and B2 that are control elements, and a transmission housing H.

Torque input from the input shaft IS is changed by cooperation of the first, the second, the third, and the fourth planetary gear sets PG1, PG2, PG3, and PG4 and the changed torque is delivered through the output shaft OS.

The planetary gear sets are arranged in the order of the first, the second, the third, and the fourth planetary gear sets PG1, PG2, PG3 and PG4 from an engine side.

The input shaft IS is an input member and the torque from a crankshaft of an engine, after being torque-converted through a torque converter, is input into the input shaft IS.

The output shaft OS is an output member, is arranged in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1. The first sun gear S1, the first planet carrier PC1, and the first ring gear R1 respectively act as first, second, and third rotational elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2. The second sun gear S2, the second planet carrier PC2, and the second ring gear R2 respectively act as fourth, fifth, and sixth rotational elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3. The third sun gear S3, the third planet carrier PC3, and the third ring gear R3 respectively act as seventh, eighth, and ninth rotational elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4. The fourth sun gear S4, the fourth planet carrier PC4, and the fourth ring gear R4 respectively act as tenth, eleventh, and twelfth rotational elements N10, N11, and N12.

The second rotational element N2 and the fourth rotational element N4 are directly connected to each other, the third rotational element N3, the sixth rotational element N6 and the tenth rotational element N10 are directly connected to each other, and the ninth rotational element N9 and the eleventh rotational element N11 are directly connected to each other such that the first, the second, the third and the fourth planetary gear sets PG1, PG2, PG3 and PG4 include eight shafts TM1 to TM8.

The eight shafts TM1 to TM8 will be described in further detail.

The eight shafts TM1 to TM8 may be rotational members that directly connect a plurality of rotational elements among the rotational elements of the planetary gear sets PG1, PG2, PG3, and PG4 with each other or that are directly connected to any one rotational element of the planetary gear sets PG1, PG2, PG3, and PG4 and rotate with the any one rotational element to transmit torque, or may be fixed members that selectively or directly connect any one rotational element of the planetary gear sets PG1, PG2, PG3, and PG4 to the transmission housing H to fix the any one rotational element.

The first shaft TM1 is connected to the first rotational element N1 (the first sun gear S1) and is selectively connected to the transmission housing H to be operated as a selective fixed element.

The second shaft TM2 is connected to the second rotational element N2 (the first planet carrier PC1) and the fourth rotational element N4 (the second sun gear S2) and is directly connected to the input shaft IS.

The third shaft TM3 is connected to the third rotational element N3 (the first ring gear R1), the sixth rotational element N6 (the second ring gear R2) and the tenth rotational element N10 (the fourth sun gear S4).

The fourth shaft TM4 is connected to the fifth rotational element N5 (the second planet carrier PC2).

The fifth shaft TM5 is connected to the seventh rotational element N7 (the third sun gear S3) and is selectively connected to the first shaft TM1 and the second shaft TM2.

The sixth shaft TM6 is connected to the eighth rotational element N8 (the third planet carrier PC3) and is selectively connected to the fourth shaft TM4.

The seventh shaft TM7 is connected to the ninth rotational element N9 (the third ring gear R3) and the eleventh rotational element N11 (the fourth planet carrier PC4) and is directly connected to the output shaft OS.

The eighth shaft TM8 is connected to the twelfth rotational element N12 (the fourth ring gear R4), is selectively connected to the sixth shaft TM6, and is selectively connected to the transmission housing H to be operated as a selective fixed element.

In addition, four clutches C1, C2, C3, and C4 are arranged at portions at which any two shafts among the eight shafts TM1 to TM8 including the input shaft IS and the output shaft OS are selectively connected to each other.

In addition, two brakes B1 and B2 are arranged at portions at which any one shaft among the eight shafts TM1 to TM8 is selectively connected to the transmission housing H.

Arrangements of the four clutches C1 to C4 and the two brakes B1 and B2 are described in detail.

The first clutch C1 is arranged between the second shaft TM2 and the fifth shaft TM5 and selectively connects second shaft TM2 and the fifth shaft TM5.

The second clutch C2 is arranged between the first shaft TM1 and the fifth shaft TM5 and selectively connects the first shaft TM1 and the fifth shaft TM5.

The third clutch C3 is arranged between the fourth shaft TM4 and the sixth shaft TM6 and selectively connects the fourth shaft TM4 and the sixth shaft TM6.

The fourth clutch C4 is arranged between the sixth shaft TM6 and the eighth shaft TM8 and selectively connects the sixth shaft TM6 and the eighth shaft TM8.

The first brake B1 is arranged between the first shaft TM1 and the transmission housing H and selectively connects the first shaft TM1 and the transmission housing H.

The second brake B2 is arranged between the eighth shaft TM8 and the transmission housing H and selectively connects the eighth shaft TM8 and the transmission housing H.

The control elements including the first, the second, the third, and the fourth clutches C1, C2, C3, and C4 and the first and second brakes B1 and B2 may be frictionally engaging units that are operated by hydraulic pressure. Particularly, the control elements may be, but not limited to, multi-plates friction elements of wet type. Also, the control elements may be engaging units that are operated by electrical signal, such as dog clutches, electric clutches, magnetic particle clutches, etc.

FIG. 2 is an operation chart of control elements at each speed stage in the planetary gear train according to one form of the present disclosure.

As shown in FIG. 2, three control elements among the first, the second, the third, and the fourth clutches C1, C2, C3, and C4 and the first and the second brakes B1 and B2 are operated at each speed stage in the planetary gear train according to one form of the present disclosure.

The second, the third clutches C2 and C3 and the second brake B2 are simultaneously operated at a first forward speed shift-stage D1.

In a state that the first shaft TM1 is connected to the fifth shaft TM5 by operation of the second clutch C2 and the fourth shaft TM4 is connected to the sixth shaft TM6 by operation of the third clutch C3, torque of the input shaft IS is input to the second shaft TM2.

In addition, the eighth shaft TM8 is operated as the fixed element by operation of the second brake B2. Therefore, the torque of the input shaft IS is shifted into the first forward speed stage, and the first forward speed stage is delivered through the output shaft OS connected to the seventh shaft TM7.

The first, the second clutches C1 and C2 and the second brake B2 are simultaneously operated at a second forward speed shift-stage D2.

In a state that the second shaft TM2 is connected to the fifth shaft TM5 by operation of the first clutch C1 and the first shaft TM1 is connected to the fifth shaft TM5 by operation of the second clutch C2, torque of the input shaft IS is input to the second shaft TM2.

In addition, the eighth shaft TM8 is operated as the fixed element by operation of the second brake B2. Therefore, the torque of the input shaft IS is shifted into the second forward speed stage, and the second forward speed stage is delivered through the output shaft OS connected to the seventh shaft TM7.

The second clutch C2 and the first and the second brakes B1 and B2 are simultaneously operated at a third forward speed shift-stage D3.

In a state that the first shaft TM1 is connected to the fifth shaft TM5 by operation of the second clutch C2, torque of the input shaft IS is input to the second shaft TM2.

In addition, the first shaft TM1 and the eighth shaft TM8 are operated as the fixed elements by operation of the first and the second brakes B1 and B2. Therefore, the torque of the input shaft IS is shifted into the third forward speed stage, and the third forward speed stage is delivered through the output shaft OS connected to the seventh shaft TM7.

The second and the fourth clutches C2 and C4 and the second brake B2 are simultaneously operated at a fourth forward speed shift-stage D4.

In a state that the first shaft TM1 is connected to the fifth shaft TM5 by operation of the second clutch C2 and the sixth shaft TM6 is connected to the eighth shaft TM8 by operation of the fourth clutch C4, torque of the input shaft IS is input to the second shaft TM2.

In addition, the eighth shaft TM8 is operated as the fixed element by operation of the second brake B2. Therefore, the torque of the input shaft IS is shifted into the fourth forward speed stage, and the fourth forward speed stage is delivered through the output shaft OS connected to the seventh shaft TM7.

The second and the fourth clutches C2 and C4 and the first brake B1 are simultaneously operated at a fifth forward speed shift-stage D5.

In a state that the first shaft TM1 is connected to the fifth shaft TM5 by operation of the second clutch C2 and the sixth shaft TM6 is connected to the eighth shaft TM8 by operation of the fourth clutch C4, torque of the input shaft IS is input to the second shaft TM2.

In addition, the first shaft TM1 is operated as the fixed element by operation of the second brake B1. Therefore, the torque of the input shaft IS is shifted into the fifth forward speed stage, and the fifth forward speed stage is delivered through the output shaft OS connected to the seventh shaft TM7.

The first, the second and the fourth clutches C1, C2, and C4 are simultaneously operated at a sixth forward speed shift-stage D6.

In a state that the second shaft TM2 is connected to the fifth shaft TM5 by operation of the first clutch C1, the first shaft TM1 is connected to the fifth shaft TM5 by operation of the second clutch C2 and the sixth shaft TM6 is connected to the eighth shaft TM8 by operation of the fourth clutch C4, torque of the input shaft IS is input to the second shaft TM2.

In this case, the first, the second, the third, and the fourth planetary gear sets PG1, PG2, PG3, and PG4 become lock-up states. Therefore, the torque of the input shaft IS is shifted into the sixth forward speed stage, and the sixth forward speed stage is delivered through the output shaft OS connected to the seventh shaft TM7. At the sixth forward speed stage, rotation speed which is the same as rotation speed of the input shaft IS is output.

The first and the fourth clutches C1 and C4 and the first brake B1 are simultaneously operated at a seventh forward speed shift-stage D7.

In a state that the second shaft TM2 is connected to the fifth shaft TM5 by operation of the first clutch C1 and the sixth shaft TM6 is connected to the eighth shaft TM8 by operation of the fourth clutch C4, torque of the input shaft IS is input to the second shaft TM2.

In addition, the first shaft TM1 is operated as the fixed element by operation of the second brake B1. Therefore, the torque of the input shaft IS is shifted into the seventh forward speed stage, and the seventh forward speed stage is delivered through the output shaft OS connected to the seventh shaft TM7.

The third and the fourth clutches C3 and C4 and the first brake B1 are simultaneously operated at an eighth forward speed shift-stage D8.

In a state that the fourth shaft TM4 is connected to the sixth shaft TM6 by operation of the third clutch C3 and the sixth shaft TM6 is connected to the eighth shaft TM8 by operation of the fourth clutch C4, torque of the input shaft IS is input to the second shaft TM2.

In addition, the first shaft TM1 is operated as the fixed element by operation of the second brake B1. Therefore, the torque of the input shaft IS is shifted into the eighth forward speed stage, and the eighth forward speed stage is delivered through the output shaft OS connected to the seventh shaft TM7.

The first and the third clutches C1 and C3 and the first brake B1 are simultaneously operated at a ninth forward speed shift-stage D9.

In a state that the second shaft TM2 is connected to the fifth shaft TM5 by operation of the first clutch C1 and the fourth shaft TM4 is connected to the sixth shaft TM6 by operation of the third clutch C3, torque of the input shaft IS is input to the second shaft TM2.

In addition, the first shaft TM1 is operated as the fixed element by operation of the second brake B1. Therefore, the torque of the input shaft IS is shifted into the ninth forward speed stage, and the ninth forward speed stage is delivered through the output shaft OS connected to the seventh shaft TM7.

The second and the third clutches C2 and C3 and the first brake B1 are simultaneously operated at a tenth forward speed shift-stage D10.

In a state that the first shaft TM1 is connected to the fifth shaft TM5 by operation of the second clutch C2 and the fourth shaft TM4 is connected to the sixth shaft TM6 by operation of the third clutch C3, torque of the input shaft IS is input to the second shaft TM2.

In addition, the first shaft TM1 is operated as the fixed element by operation of the second brake B1. Therefore, the torque of the input shaft IS is shifted into the tenth forward speed stage, and the tenth forward speed stage is delivered through the output shaft OS connected to the seventh shaft TM7.

The third and the fourth clutches C3 and C4 and the second brake B2 are simultaneously operated at a reverse speed REV.

In a state that the fourth shaft TM4 is connected to the sixth shaft TM6 by operation of the third clutch C3 and the sixth shaft TM6 is connected to the eighth shaft TM8 by operation of the fourth clutch C4, torque of the input shaft IS is input to the second shaft TM2.

In addition, the eighth shaft TM8 is operated as the fixed element by operation of the second brake B2. Therefore, the torque of the input shaft IS is shifted into the reverse speed stage, and the reverse speed stage is delivered through the output shaft OS connected to the seventh shaft TM7 as inverse rotation speed.

The planetary gear trains according to one form of the present disclosure may achieve at least ten forward speed stages and one reverse speed stage by combining four planetary gear sets PG1, PG2, PG3, and PG4 with the four clutches C1, C2, C3, and C4 and the two brakes B1 and B2.

In addition, the planetary gear train according to one form of the present disclosure may achieve suitable speed stages per rotation speed of the engine. Particularly, silent driving of the vehicle may be improved by using operation point positioned at a low rotational speed region of the engine.

Moreover, the planetary gear train according to the exemplary form of the present disclosure may enhance driving efficiency of the engine and may improve power delivery performance and fuel efficiency.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle comprising:
   an input shaft configured to receive an engine torque;
   an output shaft configured to output a shifted torque;
   a first planetary gear set having a first, a second, and a third rotational elements;
   a second planetary gear set having a fourth, a fifth, and a sixth rotational elements;
   a third planetary gear set having a seventh, an eighth, and a ninth rotational elements;
   a fourth planetary gear set having a tenth, an eleventh, and a twelfth rotational elements;
   a first shaft connected to the first rotational element;
   a second shaft connected to the second rotational element and the fourth rotational element, and connected to the input shaft;
   a third shaft connected to the third rotational element, the sixth rotational element, and the tenth rotational element;
   a fourth shaft connected to the fifth rotational element;
   a fifth shaft connected to the seventh rotational element, and selectively connected to the first shaft and the second shaft;
   a sixth shaft connected to the eighth rotational element, and selectively connected to the fourth shaft;
   a seventh shaft connected to the ninth rotational element and the eleventh rotational element, and connected to the output shaft; and
   an eighth shaft connected to the twelfth rotational element, and selectively connected to the sixth shaft.

2. The planetary gear train of claim 1, wherein each of the first shaft and the eighth shaft is selectively connected to a transmission housing.

3. The planetary gear train of claim 1, wherein:
   the first, the second, and the third rotational elements of the first planetary gear set are respectively a first sun gear, a first planet carrier, and a first ring gear;
   the fourth, the fifth, and the sixth rotational elements of the second planetary gear set are respectively a second sun gear, a second planet carrier, and a second ring gear;
   the seventh, the eighth, and the ninth rotational elements of the third planetary gear set are respectively a third sun gear, a third planet carrier, and a third ring gear; and
   the tenth, the eleventh, and the twelfth rotational elements of the fourth planetary gear set are respectively a fourth sun gear, a fourth planet carrier, and a fourth ring gear.

4. The planetary gear train of claim 1, wherein the first, the second, the third, and the fourth planetary gear sets are arranged in an order of the first, the second, the third, and the fourth, respectively, from an engine side.

5. The planetary gear train of claim 2, further comprising:
   a first clutch selectively connecting the second shaft and the fifth shaft;
   a second clutch selectively connecting the first shaft and the fifth shaft;
   a third clutch selectively connecting the fourth shaft and the sixth shaft;
   a fourth clutch selectively connecting the sixth shaft and the eighth shaft;
   a first brake selectively connecting the first shaft and the transmission housing; and
   a second brake selectively connecting the eighth shaft and the transmission housing.

6. A planetary gear train of an automatic transmission for a vehicle comprising:
   an input shaft configured to receive an engine torque;
   an output shaft configured to output a shifted torque;
   a first planetary gear set having a first, a second, and a third rotational elements;
   a second planetary gear set having a fourth, a fifth, and a sixth rotational elements;
   a third planetary gear set having a seventh, an eighth, and a ninth rotational elements; and
   a fourth planetary gear set having a tenth, an eleventh, and a twelfth rotational elements,
   wherein the input shaft is connected to the second rotational element,
   the output shaft is connected to the eleventh rotational element,
   the second rotational element is connected to the fourth rotational element,
   the third rotational element is connected to the sixth rotational element and the tenth rotational element,
   the ninth rotational element is connected to the eleventh rotational element,
   the seventh rotational element is selectively connected to the first rotational element and the second rotational element,
   the eighth rotational element is selectively connected to the fifth rotational element, and
   the twelfth rotational element is selectively connected to the eighth rotational element.

7. The planetary gear train of claim 6, wherein each of the first rotational element and the twelfth rotational element is selectively connected to a transmission housing.

8. The planetary gear train of claim 6, wherein:
   the first, the second, and the third rotational elements of the first planetary gear set are respectively a first sun gear, a first planet carrier, and a first ring gear;
   the fourth, the fifth, and the sixth rotational elements of the second planetary gear set are respectively a second sun gear, a second planet carrier, and a second ring gear;
   the seventh, the eighth, and the ninth rotational elements of the third planetary gear set are respectively a third sun gear, a third planet carrier, and a third ring gear; and
   the tenth, the eleventh, and the twelfth rotational elements of the fourth planetary gear set are respectively a fourth sun gear, a fourth planet carrier, and a fourth ring gear.

9. The planetary gear train of claim 6, wherein the first, the second, the third, and the fourth planetary gear sets are arranged in an order of the first, the second, the third, and the fourth, respectively, from an engine side.

10. The planetary gear train of claim 7, further comprising:
    a first clutch selectively connecting the fourth rotational element and the seventh rotational element;
    a second clutch selectively connecting the first rotational element and the seventh rotational element;
    a third clutch selectively connecting the fifth rotational element and the eighth rotational element;
    a fourth clutch selectively connecting the eighth rotational element and the twelfth rotational element;
    a first brake selectively connecting the first rotational element and the transmission housing; and
    a second brake selectively connecting the twelfth rotational element and the transmission housing.

* * * * *